(12) United States Patent
Chambers

(10) Patent No.: US 6,643,811 B1
(45) Date of Patent: Nov. 4, 2003

(54) SYSTEM AND METHOD TO TEST INTERNAL PCI AGENTS

(75) Inventor: Peter Chambers, Phoenix, AZ (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 242 days.

(21) Appl. No.: 09/944,876

(22) Filed: Aug. 31, 2001

Related U.S. Application Data (63) Continuation of application No. 09/177,789, filed on Oct. 22, 1998, now Pat. No. 6,324,663.

(51) Int. Cl.[7] .............................................. G01R 31/28
(52) U.S. Cl. ........................ 714/726; 714/733; 714/43
(58) Field of Search ...................... 324/158.1; 714/727, 714/30, 733, 726, 718, 25, 35, 43

(56) References Cited

U.S. PATENT DOCUMENTS

| | | | | |
|---|---|---|---|---|
| 5,604,432 A | * | 2/1997 | Moore et al. ............ 324/158.1 |
| 5,617,531 A | * | 4/1997 | Crouch et al. ................ 714/30 |
| 5,631,912 A | * | 5/1997 | Mote, Jr. ..................... 714/727 |
| 5,802,073 A | * | 9/1998 | Platt ............................ 714/733 |
| 5,852,617 A | * | 12/1998 | Mote, Jr. ..................... 714/726 |
| 6,000,048 A | * | 12/1999 | Krishna et al. ............. 714/718 |
| 6,073,253 A | * | 6/2000 | Nordstrom et al. ........... 714/25 |
| 6,131,171 A | * | 10/2000 | Whetsel ....................... 714/35 |
| 6,182,248 B1 | * | 1/2001 | Armstrong et al. ........... 714/43 |
| 6,286,115 B1 | * | 9/2001 | Stubbs ........................ 714/718 |

* cited by examiner

Primary Examiner—David Ton
(74) Attorney, Agent, or Firm—Peter Zawilski (57) ABSTRACT

The present invention is an on board internal peripheral component interconnect (PCI) bus tester for testing internal components of a microelectronic chip. The present invention includes internal PCI testing agents that facilitate the application of test vectors to internal PCI agents from a minimal number of external periphery pins on the chip. The on board internal peripheral component interconnect (PCI) bus tester then captures the state of an internal PCI bus and transmits it though the external periphery pins of the chip for analysis to determine if the internal agent components are functioning correctly.

8 Claims, 7 Drawing Sheets

SYSTEM AND METHOD TO TEST INTERNAL PCI AGENTS

This is a continuation of application Ser. No. 09/177,789 filed on Oct. 22, 1998 U.S. Pat. No. 6,324,663 which is hereby incorporated by reference to this specification.

FIELD OF THE INVENTION

The present invention relates to the field of microelectronic chip testing. More particularly, the present invention relates to a system and method to test internal PCI agents.

BACKGROUND OF THE INVENTION

Electronic systems and circuits have made a significant contribution towards the advancement of modern society and are utilized in a number of applications to achieve advantageous results. Electronic technologies such as digital computers, calculators, audio devices, video equipment and telephone systems have facilitated increased productivity and reduced costs in analyzing and communicating data, ideas and trends in most areas of business, science, education and entertainment. Frequently, these systems comprise a solid state integrated microelectronic circuit. A solid state integrated microelectronic circuit is a collection of interconnected circuit elements (e.g., resistors, diodes, transistors, etc.) fabricated on or within a single continuous substrate referred to as a chip.

Very large scale integration (VLSI) is utilized to achieve significant levels of functionality in a single application specific integrated circuit (ASIC). ASICs are often comprised of components organized in numerous blocks that perform specified functions directed to the overall operability of the ASIC. Many of the numerous blocks that perform specified functions directed to the overall operability of the ASIC are not directly accessible from the external pins during normal operations and are considered hidden or buried within the chip. The importance of ASICs in numerous applications and the significant complexities involved in the design and manufacturing of ASICs make it imperative that significant and reliable testing procedures be implemented to ensure an ASIC is functioning correctly. However, as a practical matter most test vectors are introduced to a chip at external pins and since internal devices and internal buses are buried within a chip, they are not accessible during normal operations from external pins, and thus limited in their ability to be reliably tested.

Figure 1:
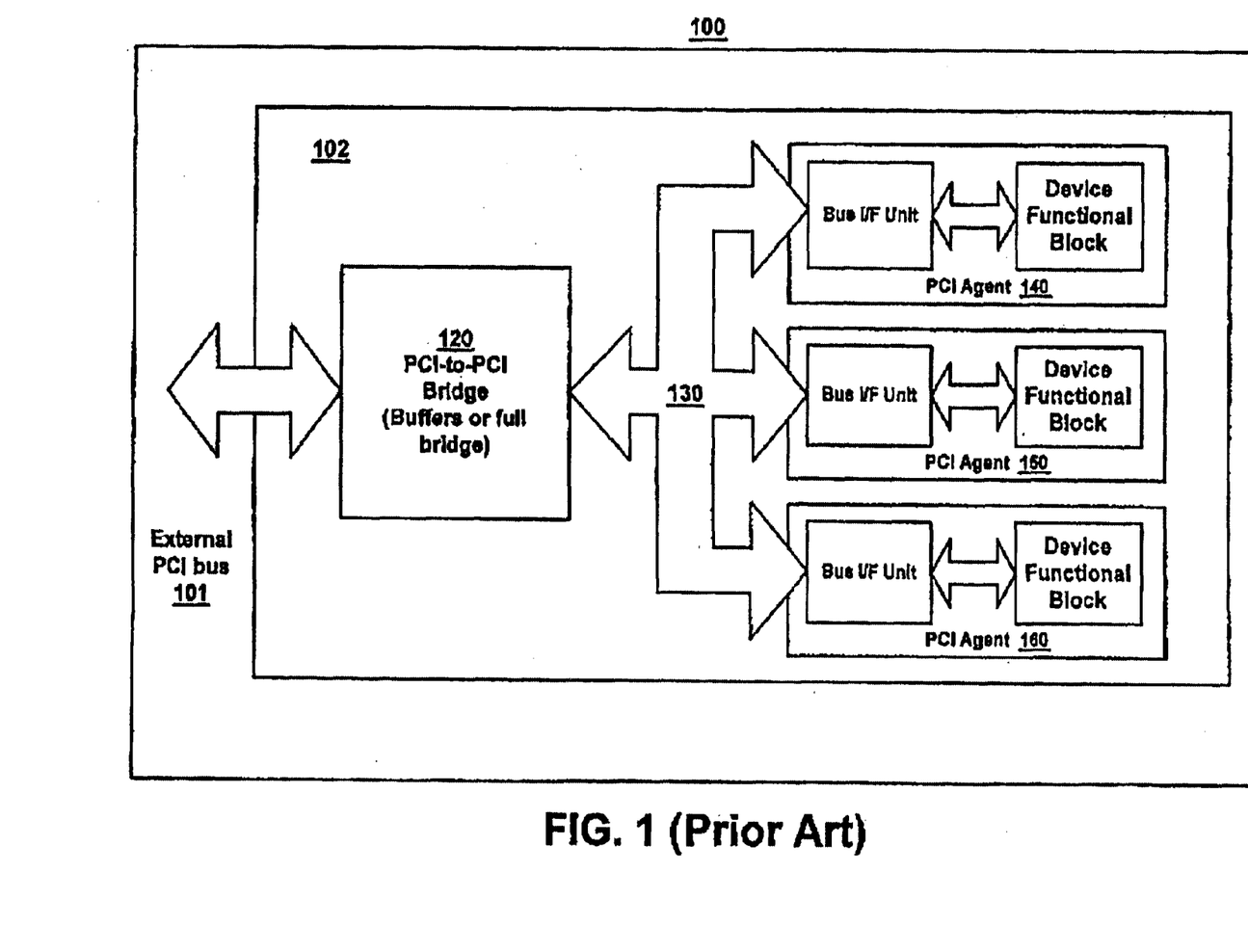
FIG. 1 is a block diagram of prior art ASIC 100, a powerful multi-functional device in which an internal PCI bus is always visible at external pins.

FIG. 1 is a block diagram of prior art ASIC 100, a powerful multi-functional device in which an internal PCI bus is always visible at external pins. ASIC 100 comprises external PCI bus interface 101 and combined multifunction device 102. Combined multifunction device 102 comprises PCI-to-PCI bridge 120, internal PCI bus 130, PCI agent block 140, PCI agent block 150 and PCI agent block 160. Each PCI block includes a bus I/F unit and a device functional block. Internal PCI bus 130, is coupled to PCI agent block 140, PCI agent block 150, PCI agent block 160 and PCI-to-PCI bridge 120 which is coupled to external PCI bus interface 101. In prior art embodiments such as ASIC 100 in which an internal PCI bus is connected to external components such as an external PCI bus, applying test vectors to internal PCI agent blocks is relatively easy but extremely inefficient. For example in ASIC 100 test vectors can be applied to the external PCI bus interface and they are transmitted through PCI-to-PCI bridge 120 and internal PCI bus 130 to PCI agent block 140, PCI agent block 150 or PCI agent block 160. Test vectors are packets of bits that act like stimuli to activate chip functions and causing the components of the chip to perform certain operations and the re interrogate the results.

While this approach in which an internal PCI bus and PCI agent blocks coupled to the PCI internal bus are permanently and completely visible does permit testing of the internal bus and PCI agent blocks coupled to the internal PCI bus, a large number of valuable external interface resources (e.g., usually between 45 and 52 pins) are expended to provide this permanent visibility. Such a large expenditure of valuable chip resources for testing that may well only be performed infrequently during the life of a chip is an expenditure of resources that is usually not outweighed by the benefits and is inefficient. Therefore design constraints often limit the ability to include an external bus interface coupled to a PCI to PCI bridge that provides permanent and complete visibility to the operations of internal agent blocks. Thus most designs include internal device that can not communicate with external devices in a normal operation mode.

Figure 2:
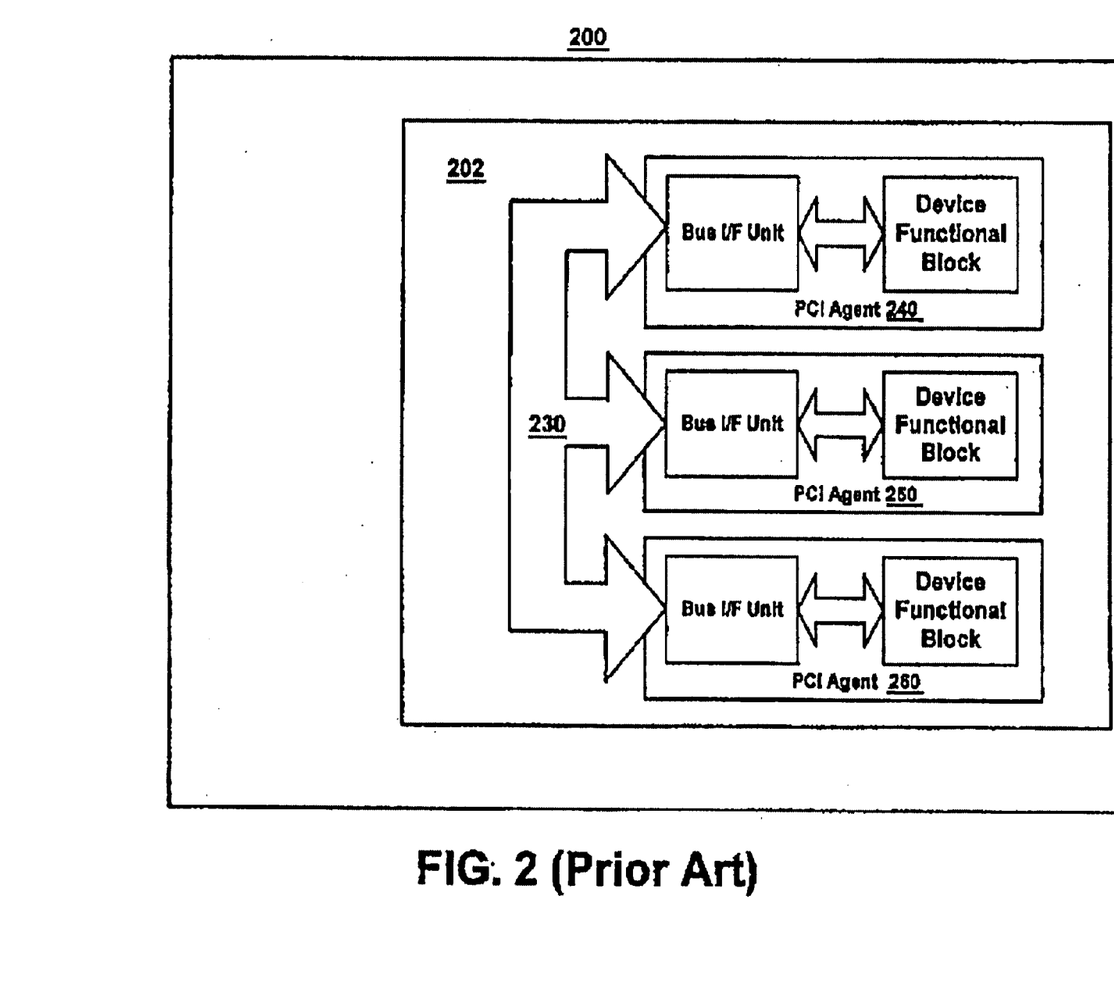
FIG. 2 is a block diagram of prior art ASIC 200, another powerful multi-functional device in which internal agents are tested utilizing test multiplexers or full boundary scan techniques.

FIG. 2 is a block diagram of prior art ASIC 200, another powerful multi-functional device. ASIC 200 comprises an external PCI bus interface (not shown) and combined multifunction device 202. Combined multifunction device 202 comprises internal PCI bus 230, PCI agent block 240, PCI agent block 250 and PCI agent block 260. Each PCI block includes a bus I/F unit and a device functional block. Internal PCI bus 230, is coupled to PCI agent block 240, PCI agent block 250, and PCI agent block 260. In prior art embodiments such as ASIC 200, in which an internal PCI bus is not connected to external components such as an external PCI bus, applying test vectors to internal PCI agent blocks is relatively difficult. For example, test multiplexes and boundary scan are two traditional prior art testing approaches utilized to test internal agent blocks of a system such as ASIC 200.

Test multiplexer techniques typically involve taking all the connections on each agent block out to the chip's periphery or external pins via multiplexers. The multiplexers are inserted in the communication paths between internal agent blocks. The multiplexers are devices that are utilized to select between one signal such as normal operations and another signal such as test vectors. In normal operations the multiplexers are configured so the chip proceeds with its normal functionality and "normal" signals appear at the chip's periphery or external pins. However, by putting the chip into a special test mode, the multiplexers are manipulated to make signals at connections to certain internal hidden agent blocks appear at the periphery external pins of the chip. Thus, the buried agent blocks can be accessed and tested by applying test vectors to the appropriate external pins.

This test multiplexer approach causes problems in systems comprising PCI devices that have very high timing constraints, especially in faster ASICs that are running at 66 megahertz and higher. Inserting test multiplexers right in the path of such timing critical signals is often unacceptable for performance reasons and typically leads to a reduction in the operating frequency of the path simply to accommodate the extra delay introduced by the multiplexers. In addition, each set of devices or PCI agent blocks within a chip require its own set of multiplexers effectively using up valuable chip resources just inserting the test multiplexers.

Full scan or boundary scan testing involves inserting special scan flip flops around the periphery of a chip. The special scan flip flops are coupled to internal buses and serially linked to each other in a path around the chip. Bit patterns to and from external devices are serially shifted into and out of the special scan flip flops. Data in the special shift registers is loaded onto and retrieved from internal buses and internal agent blocks, effectively permitting the internal agent blocks to be interrogated through this serial scan flip flop interface. Although this approach does provide a level of internal agent block testing it has numerous disadvantages.

Usually, the scan flip flops impose themselves right on the critical path of the design and often interfere with the operations of a chip to such extent that using them is impractical. Typically, scan flip flops are very slow and similar to test multiplexers introduce delays that impact performance of critical timing sequences. Scan flip flops also often introduce a delay because they are a clocked part and they require that a clocked element be placed at each signal to be interrogated. If a chip has asynchronous signals in out of a block, for example a serial port, and serial elements are driven in the asynchronous interfaces they may simply cease to function, making a scan flip flop an unviable solution in some instances.

In addition to introducing delays, scan flip flop testing technique have other disadvantages. For example, scan flip flops are typically very special scan flip flops and are not supported by all chip path technologies. In other situations a design may require very specific types of interfaces that preclude scan based register elements because access to the PCI signals for the application of preset factor tests may be difficult or impossible. In particular, PCI test vectors are usually PCI cycles such as reads and writes and utilizing boundary scan flip flops typically requires a special mechanism right on the PCI bus which in some instances may simply not work functionally. Sometimes buried agent blocks do not exist in very convenient forms and a design may be in gates without boundary scan support. A vendor may provide a design in a net list form that does not provide an understanding of the internal operation of a device and it is impractical to intelligently replace register elements within this block with scan registers without adequate knowledge.

What is required is a system and method to effectively and efficiently access internal agent blocks for testing. The system and method should permit standard test vectors to be used during manufacturing, validation and debugging procedures to exercise the functionality of chip's internal components and test its operations. The system and method should not be dependent on JTAG, boundary scan, full scan or test multiplexers.

SUMMARY OF THE INVENTION

The present invention is a system and method that effectively and efficiently facilitates testing of internal agent blocks through an on board internal bus tester for testing internal components of a microelectronic chip. The present invention includes internal testing agents that facilitate the application of test vectors from a minimal number of external pins on the chip to other internal agents and components during manufacturing, validation, and debugging procedures. The on board internal bus tester exercises the functionality of the chip's internal components and test its operations. The on board internal bus tester then captures information related to the state of an internal bus and transmits the information though the external pins of the chip for analysis to determine if internal agent components are functioning correctly. The system and method of the present invention is flexible and not dependent on JTAG, boundary scan, full scan or test multiplexers. One embodiment of the present invention is implemented in a microelectronic chip that includes an internal peripheral component interconnect (PCI) bus and internal PCI testing agents that facilitate the application of test vectors to other internal PCI agent blocks.

DESCRIPTION OF THE DRAWINGS

The accompanying drawings which are incorporated in and form a part of this specification, illustrate embodiments of the invention and together with the description, serve to explain the principles of the invention.

BEST MODE FOR CARRYING OUT THE INVENTION

Reference will now be made in detail to the preferred embodiments of the invention, a system and method to test internal PCI agents, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

The present invention is a system and method for testing the functionality and operations of internal bus agents in an integrated circuit through an on board bus tester embedded in a microelectronic chip. In one embodiment of the present invention the on board bus tester comprises a testing agent coupled to the internal bus and to a minimal number of external chip pins. The embedded bus tester facilitates the application of test vector information to an internal bus and captures information signals that appear on the internal bus in response to test vector stimulation of other internal agents or components coupled to the internal bus. The captured information is transmitted by the on board bus tester to devices external to the chip for analysis.

One embodiment of the present invention comprises several on board testing agents including, a direct access testing agent, a master testing agent, a slave testing agent and an exterior scan interface. The direct access testing agent, the master testing agent, and the slave testing agent are coupled to an internal bus which is coupled to internal agent blocks. Exterior scan interface provides a communication interface between devices outside the chip and the direct access testing agent, the master testing agent, and the slave agent embedded in the chip. The direct access testing agent is a lower level agent that provides direct access to the internal bus signals and facilitates the transmission of raw bit patterns of binary ones and zeroes to and from the internal bus. The master testing agent is a device that can generate bus transactions and thereby obtain control of the internal bus for the purpose of communicating test vector information with a slave agent coupled to the internal bus. The slave testing agent is a device that responds with test vector information and data to access requests from master agents coupled to the bus.

Figure 3:
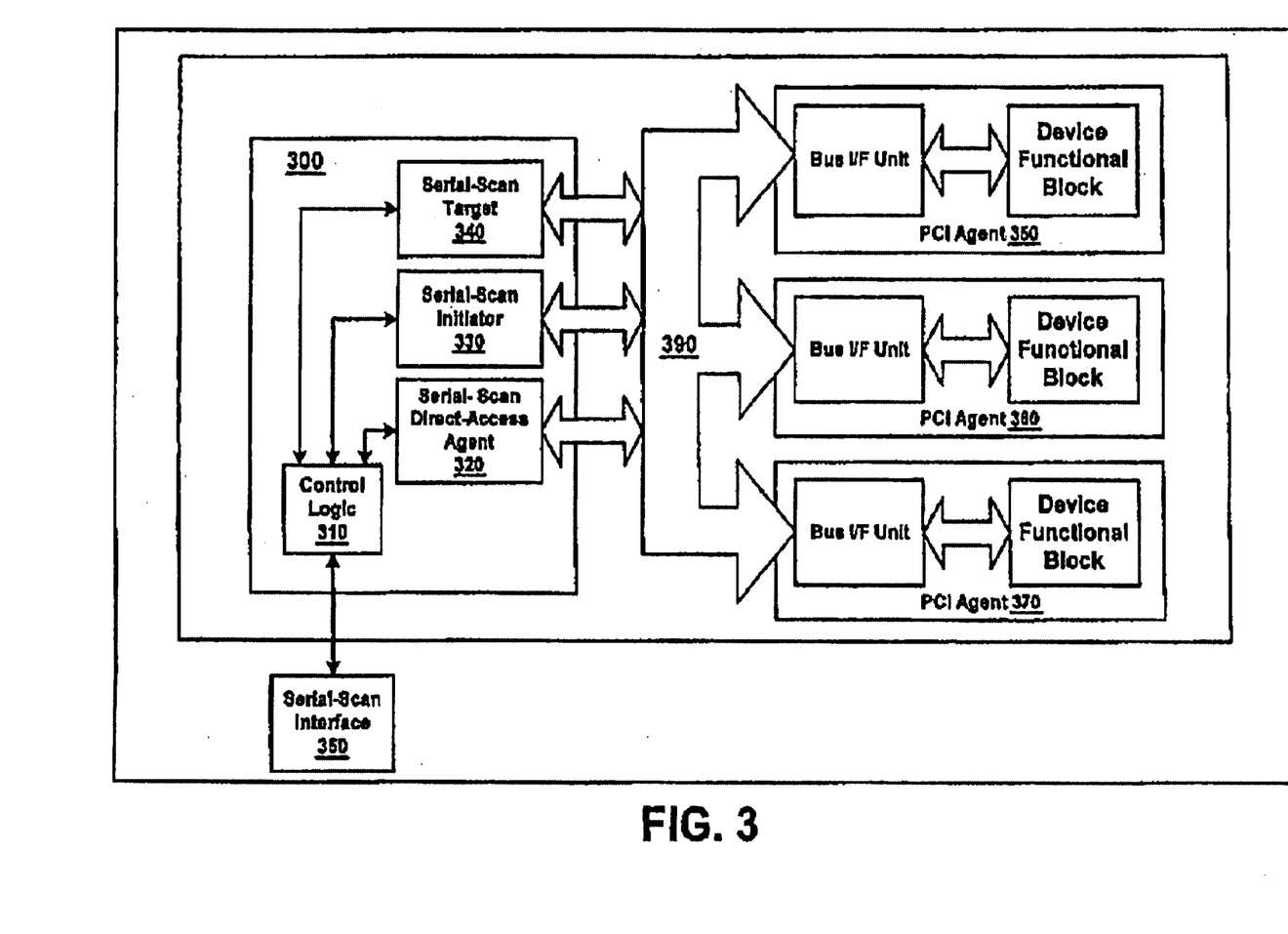
FIG. 3 is a block diagram of one embodiment of on board internal PCI bus tester system of the present invention.

FIG. 3 is a block diagram of on board internal PCI bus tester system 300, one embodiment of the present invention. PCI bus tester system 300 comprise PCI bus tester control logic 310, PCI serial scan direct access agent 320, PCI serial scan initiator 330, serial scan target 340, and PCI exterior serial scan interface 350. PCI bus tester control logic 310, is coupled to PCI serial scan direct access agent 320, PCI serial scan initiator 330, PCI serial scan target 340 and PCI exterior serial scan interface 350. In one embodiment of on board internal PCI bus tester system 300 an internal PCI bus 390 is coupled to PCI serial scan direct access agent 320, PCI serial scan initiator 330, and PCI serial scan target 340. The internal PCI bus 390 is also coupled to PCI agent block 350 PCI agent block 360 and PCI agent block 370.

On board internal PCI bus tester system 300 provides the ability to test internal PCI bus 390 and internal PCI agent blocks 350, 360, and 370. One embodiment of on board internal PCI bus tester system 300 utilizes test vectors to analyze performance of internal PCI bus 390 and internal PCI agent blocks 340, 350 and 360. In the present embodiment, test vectors stimulate an internal PCI agent block to perform its operations and whether it is functioning correctly. Verification in one embodiment of the present invention is established by analyzing the results of the operations to determine if they match expected values. On board internal PCI bus tester system 300 is utilized to perform testing during validation to make sure the chip works, during production to make sure that chip has been built correctly, and during simulation to make sure the design has been integrated correctly.

In one embodiment of on board internal PCI bus tester system 300 two types of test vectors are utilized, a raw test vector and a refined test vector. Raw test vectors are applied directly to internal bus 390 and comprise binary ones and zeros in specific bit patterns. Refined test vectors are higher level abstractions of internal PCI bus 390 behavior such as write data to an address or read data from an address. A refined test vector is a more user friendly description of internal PCI bus transactions.

External serial scan interface 350 is adapted to communicate testing information between external devices (not shown) and on board internal PCI bus tester 300 via Control logic 310. PCI bus tester control logic 310 controls and directs flows of testing information to and from internal PCI agents blocks 350, 360, and 370. PCI bus tester control logic 310 receives and transmits serial packets of test information to and from external serial scan interface 350. PCI Serial-scan direct-access agent 320 processes raw test vectors comprised of binary "1" and "0" units that fully define the state of internal PCI bus 390 lines. PCI serial-scan initiator agent 330 is a component that generates PCI transactions including asserting #FRAME signal, generating an address and obtaining access or control of internal PCI bus 390. PCI serial-scan initiator agent 330 executes refined test vectors comprising high level bus transactions and captures the state of internal PCI bus 390 lines. PCI serial scan target agent 340 is a component that responds to accesses from another PCI device that attempts to access resources on PCI serial scan target agent 340. PCI serial scan target agent 340 responds to refined test vectors comprising high level bus transactions and captures the state of the internal PCI bus 390 lines.

In one embodiment of on board internal PCI bus tester system 300 external serial scan interface 350 is implemented with a relatively small number of external chip pins (e.g., 4 external chip pins) that provide access through a serial scan protocol. It is serial in the sense that one or two signals are used just to shift in bit patterns one bit at a time rather than a parallel load which requires a lot more pins. External serial scan interface 350 takes a variety of access port forms in a variety of embodiments such as a JTAG port in one embodiment. In other embodiments of the present invention protocols other than serial scan are utilized.

Control logic 310 controls the access to the PCI testing agents and serial scan target 340, serial scan initiator 330 and serial scan direct access agent 320. The control logic responds to an exterior test mode signal transmitted through serial scan interface 350. In other embodiments of the present invention some testing procedures are executed automatically by control logic 310. The present test mode enables or disables serial interfaces through which control information related to particular test vectors is transmitted. Control logic 310 performs numerous control functions including receiving test vector comprising bit packets, transmitting test vector bit packets, and directing the flow of information to and from internal agents, such as internal PCI agent blocks 350, 360, and 370. Control logic 310 effectively performs the arbitration through a serial enabling method that selects which one of the internal agents, such as internal, PCI agent blocks 350, 360, and 370 are really going to be communicated with and tested.

Figure 4:
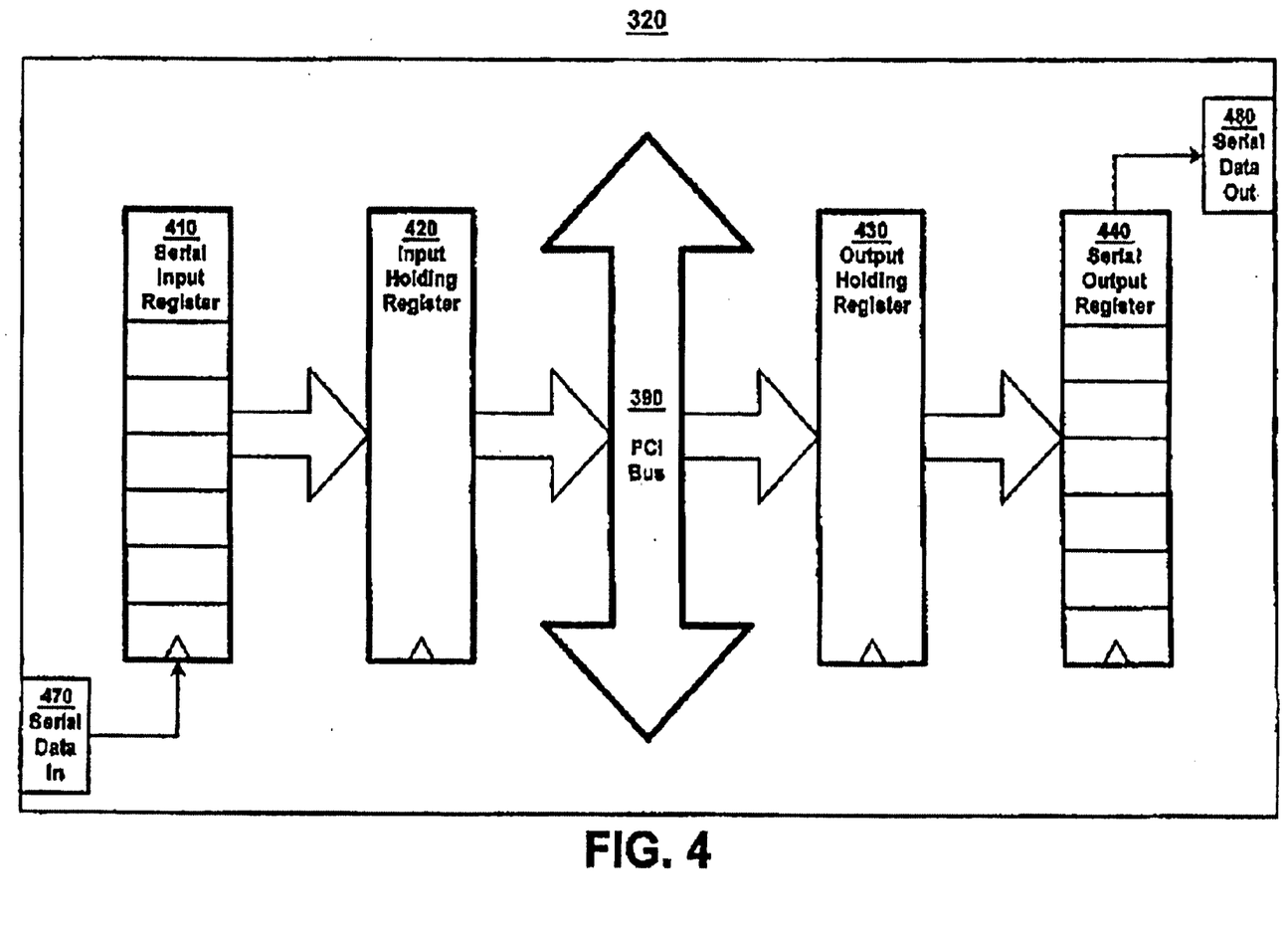
FIG. 4 is a block diagram of one embodiment of PCI serial scan direct access testing agent of the present invention.

FIG. 4 is a block diagram of one embodiment of PCI serial scan direct access agent 320. The present embodiment of PCI serial scan direct access agent 320 comprises serial input shift register 410, input holding register 420, output holding register 430 and serial output register 440. Serial input shift register 410 is coupled to input holding register 420 and serial output register 440 is coupled to output holding register 430. Internal PCI bus 390 is coupled to input holding register 420 and output holding register 430.

Serial data in 470 from control logic 310 is shifted one bit at a time into serial input shift register 410, which is a shift register. When a complete PCI bus bit pattern has been shifted into serial input shift register 410 the bit pattern is parallel loaded into input holding register 420, which is a parallel register. PCI serial scan direct access agent 320 presents the whole bit pattern to the internal PCI bus 390, a complete bit pattern comprises one bit for each signal or line that is present on internal PCI bus 390, which in the present embodiment is 50 signals. Internal PCI bus 390 and agents such as PCI agent block 350, PCI agent block 360 and PCI agent block 370 coupled to internal PCI bus 390 are clocked after the bit pattern has been applied to internal PCI bus 390.

The new state of internal PCI bus 390 is captured in output holding register 430, all under direction of the control logic 310. For example, a test vector simulating a write function is applied using raw test vectors comprised of binary "1" and "0" units to apply the address and FRAME#. Then internal PCI bus 390 is strobed changing the state of internal PCI bus 390 to assert a FRAME# signal, an IRDY# ready signal and write data to internal PCI bus 390. It is continuously strobed until the transaction is complete. The captured signals are not really "written", they are just left in tri-state and then output holding register 430 captures the state of those signals. After the data is captured it is parallel loaded into serial output register 440. The Serial data out 480 is shifted out via serial output register 440 back into control logic 310. The data is provided to external devices via external interface 350 and analyzed to determine if it matches expected results.

PCI serial scan direct access agent 320 is a very simple and efficient component for applying raw or dumb type test vectors as a series of ones and zeros and then examining resulting bit patterns to determine if they match expected bit patterns. The state of internal PCI bus 390 is captured on every clock cycle. In one embodiment of the present invention control logic 310 is configured so that serial output register 440 only shifts out data pertinent to test results. For example in a PCI write cycle the address and the FRAME# are applied in the first phase and then write data is applied, it takes several clock cycles for the write to complete these phases. The interest in seeing if the target responded correctly to this bus access occurs after three or four clocks and there is no substantive interest in the results of a capture during the three or four clocks of the intermediate phases.

Figure 5:
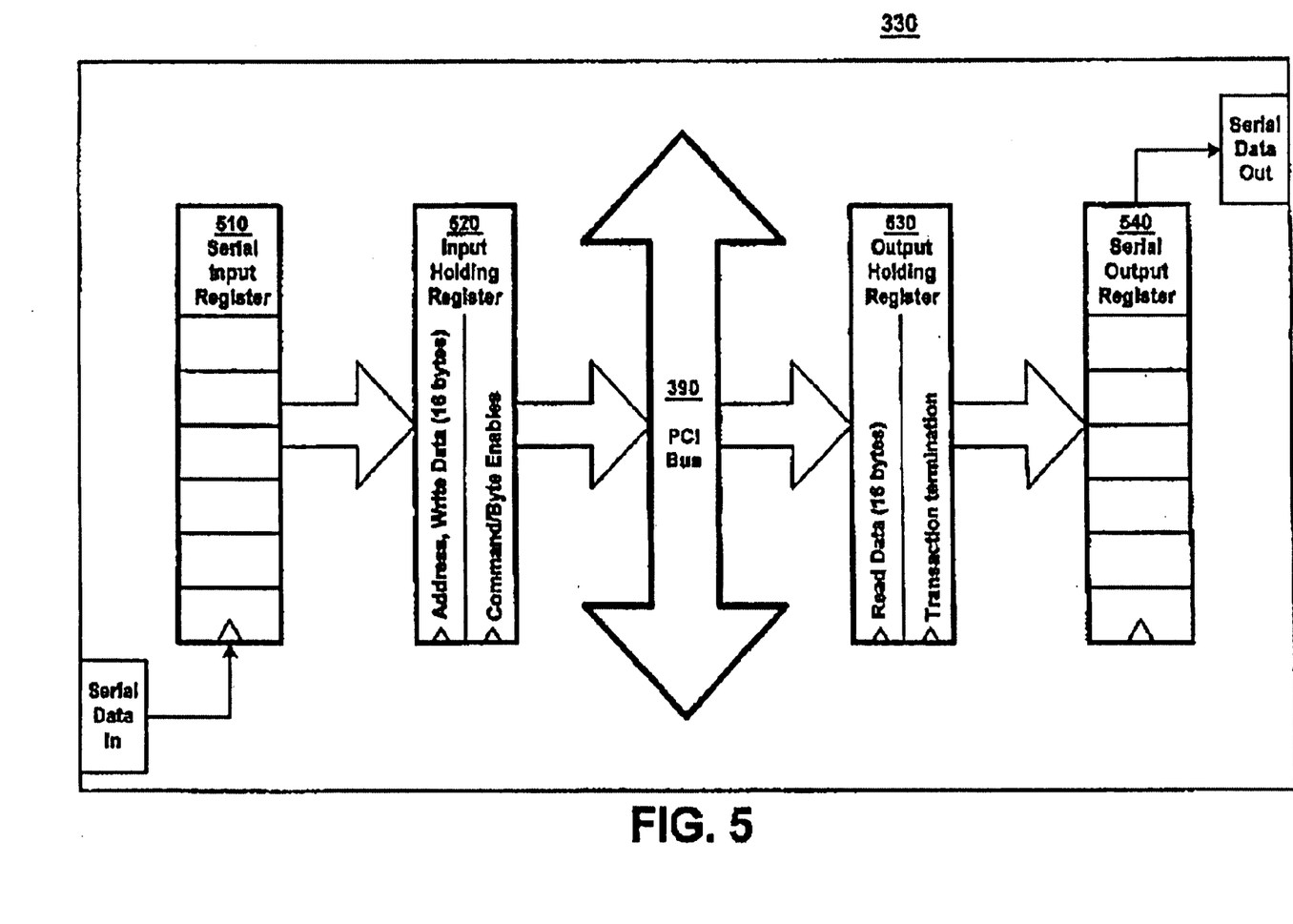
FIG. 5 is a block diagram of one embodiment of a PCI serial-scan initiator testing agent of the present invention.

FIG. 5 is a block diagram of one embodiment of PCI serial-scan initiator agent 330. The present embodiment of PCI serial-scan initiator agent 330 comprises serial input register 510, input holding register 520, output holding register 530 and serial output register 540. PCI serial-scan initiator agent 330 processes test vectors comprising high level format such as PCI read and write commands that PCI serial scan initiation agent 330 and a target such as PCI agent blocks 350, 360, and 370 are going to respond to. PCI serial-scan initiator agent 330 executes PCI reads in conformance with standard PCI master protocols for a PCI transaction, except that it is given a command to do so through a serial input register. Serial input register 510 and input holding register 520 are sufficient to hold all the attributes that define the PCI access. For example, a write cycle requires an address, write data (data to be "written" to a certain address), it requires the type of command, and the byte enables indication (the 4 bits in PCI that indicate which byte lanes are valid). The type of command is specified because there are several different sorts of write cycles on internal PCI bus 390 (e.g., write to I/O space, write to configuration space, write to memory space).

During testing serial-scan initiator agent 330 acts as a PCI initiator agent coupled to internal PCI bus 390 and initiates target accesses via internal PCI bus 390 to determine if PCI targets such as PCI agent blocks 350, 360, and 370 respond appropriately to access requests and PCI transactions. PCI serial-scan initiator agent 330 is loaded with PCI transaction parameters such as an address for an address phase, a command for the address phase and data for write commands (e.g., four 32-bit values). Since PCI serial-scan initiator agent 330 has been primed with the PCI transaction parameters, control logic 310 instructs it to run the cycle autonomously without shifting data in or shifting data out, causing serial-scan initiator agent 330 to request the bus, complete the cycle using the predefined parameters and then signal completion to control logic 310. It really just does one bus cycle in which one transaction occurs but it functions through as many clock cycles as required to complete that bus cycle or access. One transaction such as a PCI read, PCI write, or a PCI burst operation (even if it requires multiple data phases) will occur and the transaction runs all the way to completion regardless of the number of clock cycles.

At the completion of a transaction the state of internal PCI bus 390 is loaded in output holding registers 350. If the PCI transaction involves a read command, the received data is loaded into a set of read data buffers. For example, four 32 bit operands might be read from the bus in a burst transaction. The type of transaction termination indication received at the end of the PCI transaction indicating how a cycle ended is also loaded. The type of transaction termination indicates if the cycle ended successfully or in a failure such as a target abort indication, a master abort indication, a retry indication, or disconnect indication (all of which are considered abnormal terminations) or did it end normally with read data being provided or write data being accepted. Then the contents of those registers are shifted out through serial data output register 540 and control logic 310 to external devices where it can be examined to determine if the transaction occurred correctly or not.

Figure 6:
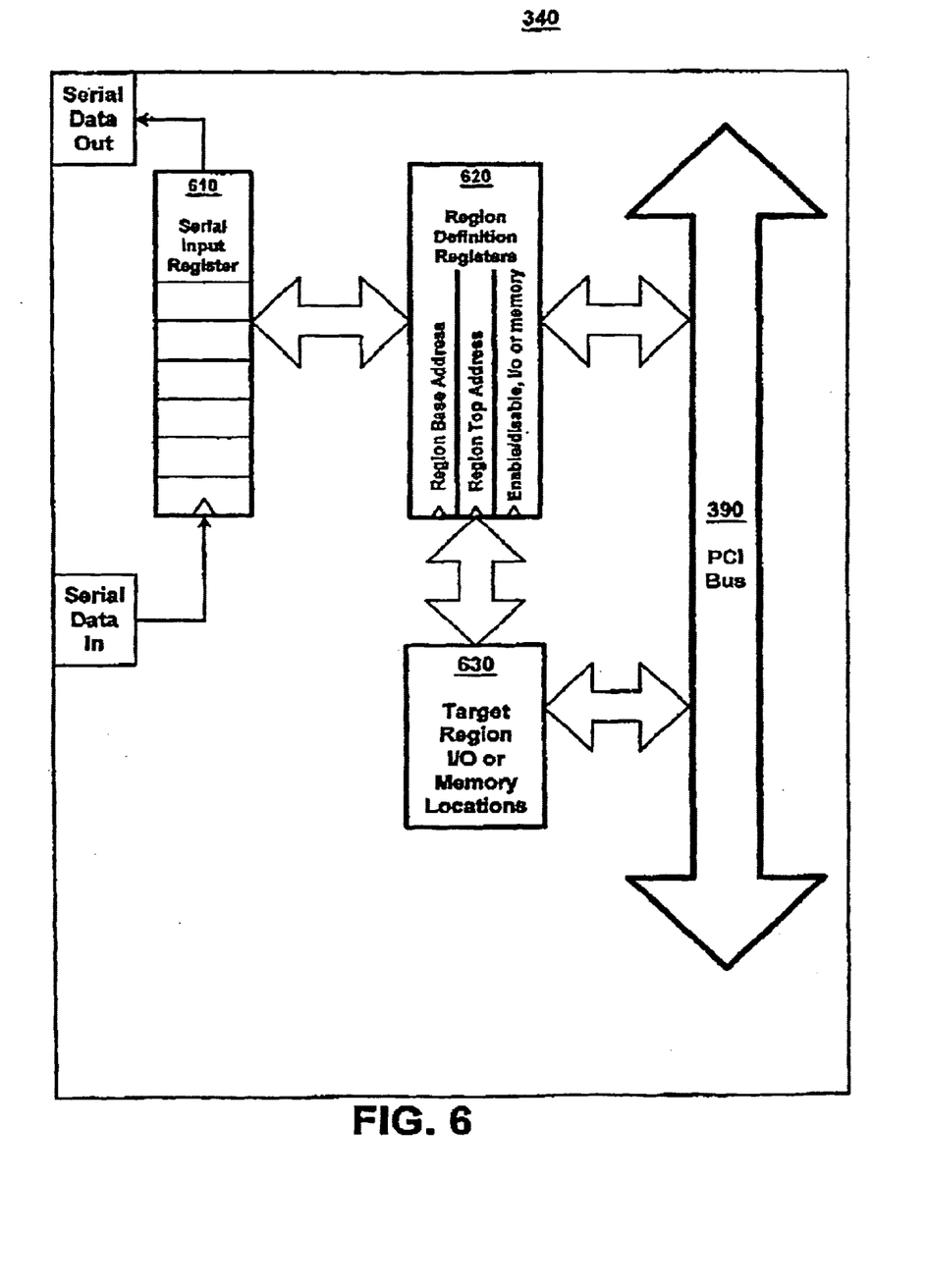
FIG. 6 is a block diagram of one embodiment of serial scan target testing agent of the present invention.

FIG. 6 is a block diagram of one embodiment of serial scan target 340. The present embodiment of serial scan target 340 comprises serial input/output register 610, region definition registers 620 and target region I/O or memory locations 630. Serial input/output register 610 is coupled to region definition registers 620 which are coupled to target region I/O or memory locations 630. Region definition registers 620 and target region I/O or memory locations 630 are coupled to internal PCI bus 390. Serial scan target 340 is essentially a generic PCI target capable of functioning as a target for each of the internal PCI agent blocks on a chip such as internal PCI agent blocks 350, 360, and 370. An internal PCI initiator expects to have a target with at least a little memory to respond to the internal PCI initiator access requests (e.g., to read out commands, to read out data etc.) and serial scan target 340 functions in this capacity during testing procedures.

In the present embodiment serial scan target 340 is primed to respond to a certain set of PCI transactions involving input/output (I/O) or memory. Thus, serial scan target 340 is capable of looking like an I/O space or memory space to a PCI master such as internal PCI agent blocks 350, 360, and 370. Serial scan target 340 has multiple regions, for example in one embodiment it has two address ranges and in another embodiment is has three address ranges. The multiple address ranges are useful to internal PCI masters because internal PCI masters often use different memory regions for data and command. Therefore, serial scan target 340 stores the commands in one place and the data will go elsewhere. Each of these multiple regions (e.g., two or three regions) has a base address and the top address and each region can be turned on or off, enabled or disabled. The regions are relatively small because it is undesirable for serial scan target 340 to take up to much space on chip. For example in one embodiment these regions are limited to 128 bytes. In other embodiments it can be much more or it can be much less. Each region is pre-loaded or primed and once the base address and top address are loaded the contents can also be pre-loaded. As indicated in FIG. 6 region definition registers 620 are accessible through serial input/output register 610 and region definition registers 620 also communicates with target region I/O or memory locations 630. Region definition registers 620 define certain things about serial scan target 340 that enable it to act as a generic PCI target, such as where it sits in PCI each space, is it I/O space or memory space, is enabled or disabled and the actual contents are also defined.

In one present embodiment of the present invention serial packets are utilized to communicate between control logic 310 and exterior devices. A serial packet is a description of a serial bit pattern which comprises one unit of information which is transmitted to and from an agent such as serial scan target 340, serial scan initiator 330 and serial scan direct access agent 320. A serial packet has a start of packet field that indicates a new packet is starting. It is followed by a command field that provides instructions such as load direct access agent, retrieve data from direct access agent, load serial scan initiator, start serial scan initiator, retrieve data from serial scan initiator, load serial scan target, retrieve data from serial scan target, etc. Then there is an end of packet field that indicates that a packet is complete.

Figure 7:
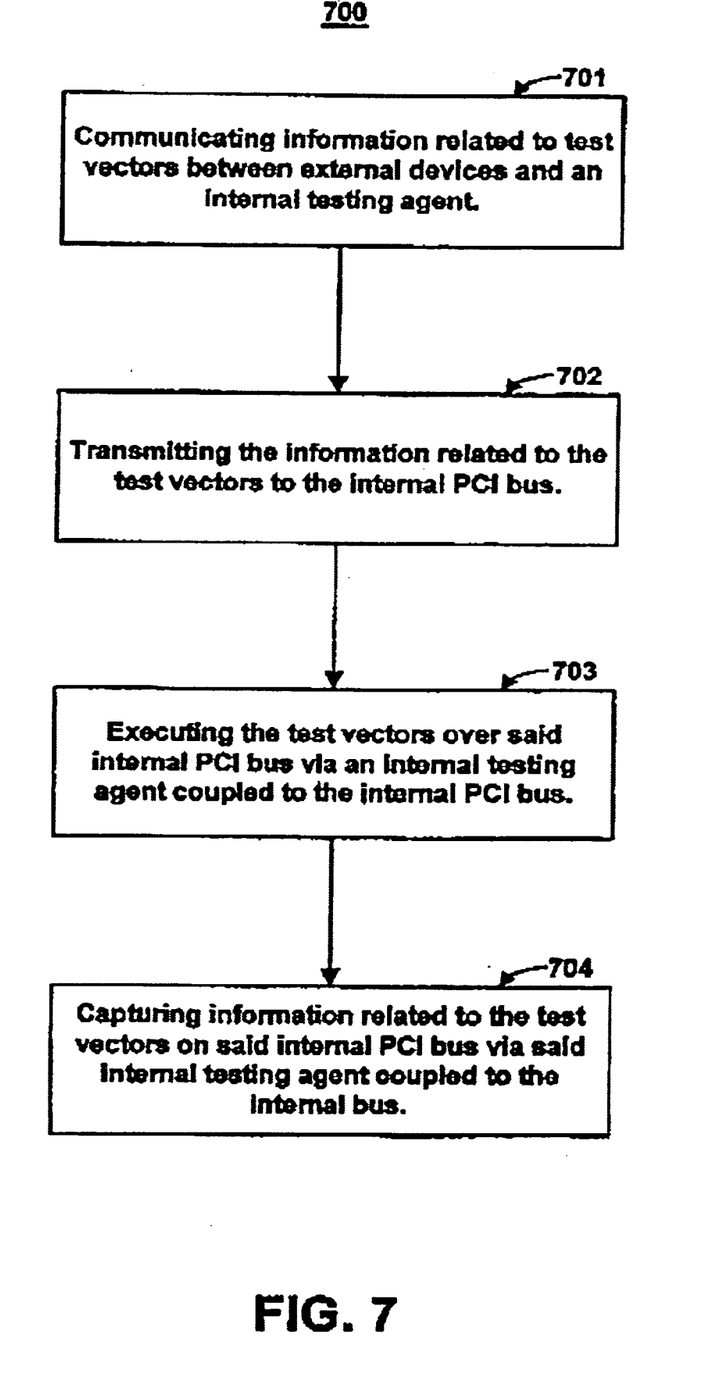
FIG. 7 is a flow chart of one embodiment of internal bus testing method of the present invention.

FIG. 7 is a flow chart of internal bus testing method 700, one embodiment of the present invention. Internal bus testing method 700 permits external test vectors to be applied to internal bus agents and resulting signals that appear on the internal bus to be communicated to external devices for analysis.

In step 701 information related to test vectors is communicated between external devices and internal testing agent. In one embodiment of internal bus testing method 700 raw test vectors are loaded in a direct access testing agent. In another embodiment of internal bus testing method 700 refined test vectors are moved into a high level testing agent such as an initiator testing agent or a target testing agent.

In step 702 the information related to the test vectors is transmitted to the internal PCI bus. In one embodiment of the present invention an initiator testing agent transfers information related to the test vectors to an internal PCI bus. In another embodiment a target testing agent conveys information related to a test vector to an internal PCI bus.

In step 703 the test vectors are executed over the internal PCI bus via an internal testing agent coupled to the internal PCI bus. In one embodiment of the present invention an initiator testing agent engages in a PCI bus transaction with an internal target. In another embodiment of the present invention a target testing agent responds to a PCI bus transaction of an internal initiator agent attempting to access the target testing agent.

In step 704 information related to the test vectors on the internal PCI bus is captured via the internal testing agent coupled to the internal bus. In one embodiment of the present invention the information related to test vectors is placed in a direct access testing agent. In another embodiment the information is deposited in an input/output shift register.

Thus, the system and method of the present invention provides accessibility to totally internal PCI functional agent blocks. The present invention supports use of both standard test vectors (both the raw type of ones and zero and refined type of cycle descriptions of reads and writes). The present invention is versatile and is utilized for production tests (so you can verify it works before it is sent to the customer) and for debug testing of a chip (e.g., in a lab it provides excellent visibility to as to what is going on a hidden PCI bus). It is capable of operating with user friendly protocol using high-level bus transaction cycles. There is no need for JTAG, boundary scan, full scan or test multiplexers and it requires relatively few external pins.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An internal bus testing method that provides testing control and visibility of an internal PCI bus state utilizing an on board internal PCI bus tester, comprising the steps of;

a communicating information related to test vectors between external devices and internal testing agent;

b transmitting said information related to said test vectors to said internal PCI bus;

c executing said test vectors over said internal PCI bus via an internal testing agent coupled to said internal PCI bus; and d capturing information related to said test vectors on said internal PCI bus via said internal testing agent coupled to said internal bus.

2. The method of claim 1 wherein step a further comprises the steps of:

loading raw test vectors in a direct access testing agent; and moving refined test vectors into a high level testing agent such as an initiator testing agent or a target testing agent.

3. The method of claim 1 wherein step a further comprises the steps of:

transferring information related to the test vectors to an internal PCI bus from an initiator testing agent; and conveying information related to a test vector to an internal PCI bus from a target testing agent.

4. The method of claim 1 wherein step a further comprises the steps of:

engaging in a PCI bus transaction with an internal target by an initiator testing agent; and responding to a PCI bus transaction of an internal target agent attempting to access a target testing agent.

5. The method of claim 1 wherein step a further comprises the steps of:

placing the information related to test vectors in a direct access testing agent; and depositing information related to test vectors in an input/output shift register.

6. The method of claim 1 wherein said internal testing agent comprises a PCI serial scan direct access agent adapted to process raw test vectors comprised of binary ones and zeroes that fully define the state of said internal bus.

7. The method of claim 1 wherein said internal testing agent comprises a PCI serial scan initiator agent adapted to generate PCI transactions and obtain control of internal PCI bus.

8. The method of claim 1 wherein said internal testing agent comprises a PCI serial scan target agent adapted to respond to access attempts from a PCI initiator coupled to said PCI bus.

* * * * *